July 25, 1939.  J. VERDERBER  2,167,014
SOCKET-SHANK STRUCTURE
Filed May 20, 1937
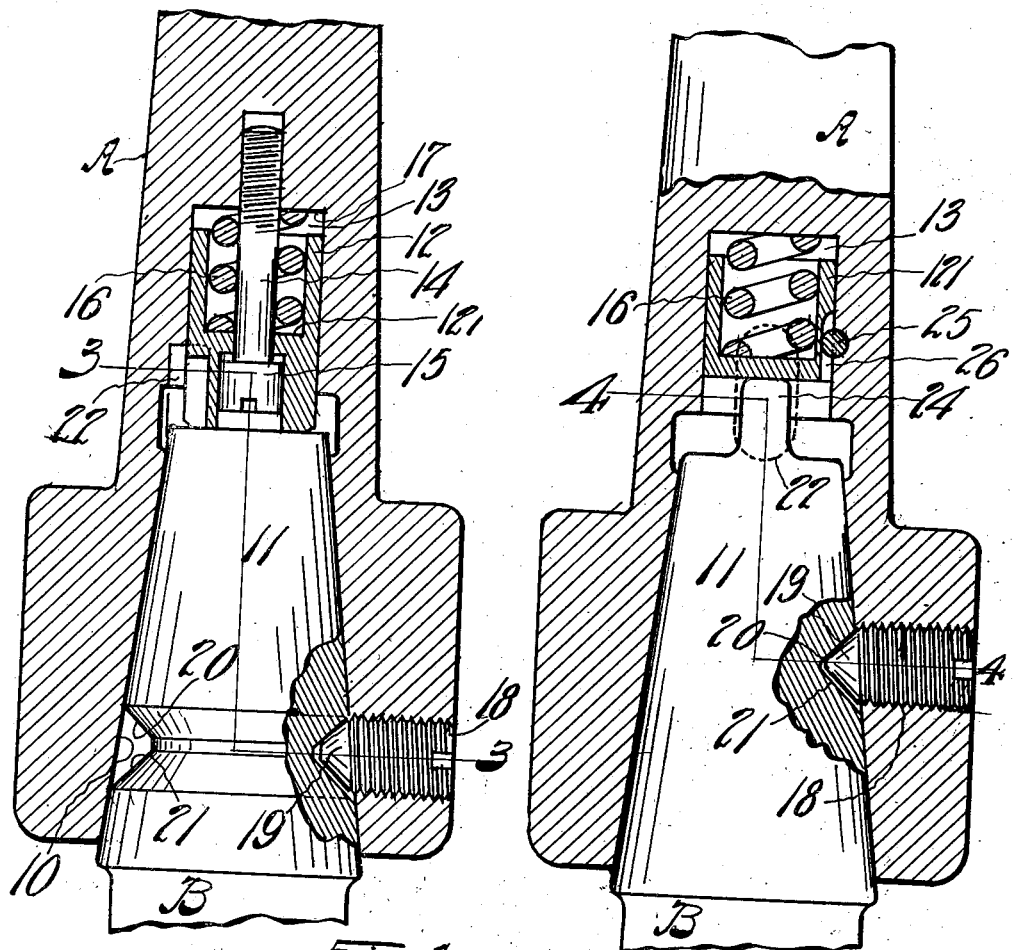
INVENTOR.
Jos. Verderber
BY C. J. Henkel
ATTORNEY.

Patented July 25, 1939

2,167,014

UNITED STATES PATENT OFFICE 2,167,014

SOCKET-SHANK STRUCTURE

Joseph Verderber, Cleveland, Ohio

Application May 20, 1937, Serial No. 143,743

1 Claim. (Cl. 279—83)

The present invention relates to co-operating shank and socket structures for holding a shank in a socket and releasing the same from the socket.

In the prior art, shanks, usually, are held in a socket by friction therebetween and in some instances set screws are used in straight shank structures. This has been found unsatisfactory since set screws usually throw the shank and socket out of alinement and the taper shanks must be driven out by a drift or equivalent and this entails a loss of time. Also, taper shanks are driven into the socket with some force not controlled in any manner and frequently wedge themselves in the socket very tightly so that considerable force is required to drive them out.

In the present invention, the shanks are inserted just sufficiently for approximate relation thereof to a socket, a manually operated mechanism then brings the shanks into their seats and holds them there until manually released, and a spring operated mechanism releases the shanks automatically when the holding means for the shanks is released. A drift means for the shanks is provided so that additional force may be applied to the end of the shanks when the same stick more tightly than the power of the spring in the spring operated mechanism.

Objects of the present invention are:

To provide a means between a shank and a socket that will move the shank in the socket to bring the same into correct seating in the socket without unnecessary friction between the shank and the socket.

To provide a means whereby the shank is released or unseated automatically when the holding means for the shank is released.

To provide an emergency means for releasing a shank from a socket when necessary.

To provide a means between a shank and a socket that will locate or seat the shank in the socket longitudinally as well as rotatively.

To provide a means whereby taper shanks can not be wedged too tightly in a socket.

Other objects will be pointed out during the description of the device shown in the accompanying drawing or will become obvious or apparent or will suggest themselves upon an inspection of the accompanying drawing and this specification.

In the accompanying drawing, forming part of this specification and being presented for illustrating purposes only:

Fig. 1 is a longitudinal section of a shank and socket embodying the present invention; the section being taken on the line 1—1 of Fig. 3; and shows a socket and a shank therein and the means for bringing the shank home in the socket and for preventing the shank from being wedged too tightly in the socket and a means for releasing the shank from the socket.

Fig. 2 is a longitudinal section, except the upper end, similar to Fig. 1; the section being taken on the line 2—2 of Fig. 4 and showing similar to Fig. 1 except some modifications clearly described in this specification.

Fig. 3 is a transverse section, taken on the line 3—3 of Fig. 1 and shows transverse relations of elements.

Fig. 4 is a transverse section taken on the line 4—4 of Fig. 2 and also shows transverse relations of elements.

Similar reference characters refer to similar parts throughout the views.

Referring now specifically to the device shown in Figs. 1 and 3.

The body or socket A has the bore 10 longitudinally therein. In the illustration there shown, the bore is tapered. The bore is to fit the shank 11 on the part B.

The cup 12 fits longitudinally slidably in the bore 13 and is held in relation to the collet by the screw 14 threaded into the bottom of the bore 13. The cup has longitudinal movement in the bore 13 and the amount of the longitudinal movement is controlled by adjusting the screw 14 in the socket and the head 15 on the screw 14 prevents the cup 12 from falling out of the socket.

The spring 16 is telescoped over the screw 14 and is confined in the cup 12; one end of the spring abutting the bottom 17 of the bore 13 and the other end thereof abutting the bottom wall 121 of the cup 12. Adjusting movement of the screw 14 moves the cup 12 longitudinally in the bore 13 and varies the power of the spring 16.

The screw 18 is threaded into the socket and has the pointed or conical end 19 preferably of the same taper as the taper sides 20 and 21 of the annular groove cut into the shank near the heavier or diametrically larger part of the shank so that the shank may not be materially weakened by the cutting of the groove.

The drift slot 22 is cut through the socket at one side of the axis thereof to clear the screw 14 sidewise by a drift being inserted into the slot 22.

As to operation of the device shown in Figs. 1 and 3:

When the shank 11 is to be inserted into the socket, the screw 18 is screwed sufficiently far back so that the shank can clear the point of the screw. The shank is then inserted into the bore 10 as far as it will go up without putting undue longitudinal pressure thereon. The screw 18 is then screwed inwardly whereupon the point thereof will engage in the groove in the shank. This engagement of the point is on the wall 20 of the groove and, by the further screwing in of the screw 18, moves the shank upwardly in the socket and thereby seats the same in the socket.

It is to be noted that the point of the screw 18 does not contact the wall 21 and that there is a small clearance between the point of the screw and the wall 21. This allows that the shank can be moved up further than shown when it is desired to seat the shank in the socket more tightly than is shown. With this arrangement, the shank may be seated as tightly as desired or as loosely as desired depending upon work to be done by the shank and mechanism thereon.

It is preferred that this clearance between the point of the screw and the wall 21 be not too great so that the point of the screw will contact both walls of the groove and prevent the shank from moving up into the socket too far so as to stick too tightly therein.

This upward movement of the shank by the screw 18 compresses the spring 16 through the cup 12. When the screw 18 is released, the spring 16 automatically moves the shank outwardly of the socket or releases it therefrom so that the shank carrying element can be removed easily. The drift slot is provided to forcibly drive the shank out of the socket in the event that the shank has stuck too tight for the spring 16 to release.

The groove in Figs. 1 and 3 is annular; therefore, the shank may be inserted into the socket without paying attention to its rotative relation to the socket.

The structure shown in Figs. 2 and 4 is substantially similar to that of Figs. 1 and 3 except that the shank here has the tang 24; the cup 121 abuts the upper end of the tang and is here kept from falling out by the pin 25 driven transversely through socket and engaging the longitudinal groove 26. The groove 26 being sufficiently long to permit endwise movement of the cup in the socket. The screw 18 also has a pointed or conical end to engage the depression in the shank. The depression here is a conical countersink as distinguished from the annular depression shown in Figs. 1 and 3.

The relation of the point of the screw and the walls of the depression here is similar to that above described as is also the general operation of this structure.

In Fig. 2, the screw 18 prevents rotation of the shank in the socket whereas in Fig. 1 the shank can rotate. When a tang becomes twisted on the shank it will not interfere with the structure of Fig. 1 and the screw mounting in Fig. 2 prevents the tang from twisting in that rotation of the shank in the socket is prevented by the screw 18 having the pointed end firmly seated in the depression here formed according to the pointed end of the screw.

The structure herein shown and described is simple of structure and easy and convenient of operation; releases shanks automatically, prevents shanks being driven into sockets too tightly, permits of shanks being driven into sockets just sufficiently tight for work to be done and presents an easy and convenient means for easily and conveniently inserting and releasing shanks from sockets.

The structure shown and described avoids the disadvantages and inconveniences of the prior art and presents a structure more efficient and more lasting than in the prior art.

Having described my invention and being aware that modifications may be made therein from the structure of the parts and the arrangements thereof as herein specifically shown and described and without limiting myself to the precise structure and arrangements of parts as shown and described.

I claim:

In combination, a socket-shank structure consisting only of a socket having a longitudinal bore in an end thereof and a drift slot traversing the bore, a shank insertable into and fitting to a portion of said bore and having a taper sided depression therein intermediate the ends thereof, a manually operable screw threaded into said socket traversely of the longitudinal axis thereof and having a taper end engageable with a taper side of said depression for moving said shank into position in said bore and retaining the same therein and releasing the same therefrom and disengaging said side of the depression for removing the shank from the socket, and a spring-pressed cup mounted longitudinally movable in the bottom part of said bore and bearing against the inner end of said shank for moving the same outwardly of said socket when the taper part of said screw has released said shank; said drift slot having the top thereof above the bottom of said cup and the bottom thereof below the bottom of said cup for inserting a drift pin and forcibly releasing said shank from said socket.

JOSEPH VERDERBER.